(12) United States Patent
Mazeaud et al.

(10) Patent No.: US 7,805,949 B2
(45) Date of Patent: Oct. 5, 2010

(54) DEVICE FOR SUPPORTING AND HOUSING AUXILIARIES IN A BYPASS TURBOJET

(75) Inventors: Georges Mazeaud, Yerres (FR); Didier Jean-Louis Yvon, Savigny sur Orge (FR)

(73) Assignee: SNECMA, Paris (FR)

( * ) Notice: Subject to any disclaimer, the term of this patent is extended or adjusted under 35 U.S.C. 154(b) by 1101 days.

(21) Appl. No.: 11/427,151

(22) Filed: Jun. 28, 2006

(65) Prior Publication Data
US 2007/0084216 A1   Apr. 19, 2007

(30) Foreign Application Priority Data
Jun. 29, 2005  (FR) .................................. 05 06612

(51) Int. Cl.
*F02K 3/04* (2006.01)
*F02C 7/32* (2006.01)

(52) U.S. Cl. .............................. 60/796; 60/798; 60/802; 244/129.4

(58) Field of Classification Search ................ 60/226.1, 60/226.2, 796–798, 802, 795; 244/129.4, 244/129.5
See application file for complete search history.

(56) References Cited
U.S. PATENT DOCUMENTS 2,827,760 A    3/1958  Marchant et al.
3,571,977 A *  3/1971  Abeel ....................... 244/129.5
3,777,489 A * 12/1973  Johnson et al. ............ 60/226.1
5,012,639 A *  5/1991  Ream et al. ................ 60/226.1
5,123,242 A *  6/1992  Miller ....................... 60/226.1
5,357,744 A   10/1994  Czachor et al.
6,012,735 A *  1/2000  Gray et al. ................ 280/728.2
6,581,874 B2*  6/2003  Lemire et al. .................. 60/797
7,484,354 B2*  2/2009  Stretton ....................... 60/802
7,607,308 B2* 10/2009  Kraft et al. .................... 60/795
2004/0111829 A1  6/2004  Bruno et al.
2006/0038065 A1*  2/2006  Howe et al. ..................... 244/54
2006/0053799 A1*  3/2006  Aycock et al. ................. 60/772

FOREIGN PATENT DOCUMENTS

EP        0 601 864 A1   6/1994
WO    WO-2005/005810   *  1/2005

* cited by examiner

*Primary Examiner*—Ted Kim
(74) *Attorney, Agent, or Firm*—Oblon, Spivak, McClelland, Maier & Neustadt, L.L.P.

(57) ABSTRACT

A device for supporting and housing auxiliaries in a bypass turbojet is disclosed. The device includes two coaxial case rings arranged one inside the other and connected by tubular radial arms through which fluid ducts and electric cables pass. At least one of the radial arms includes on a lateral face a detachable panel whose removal allows access to turbojet equipment situated radially inside the internal case ring in alignment with the radial arm.

14 Claims, 3 Drawing Sheets

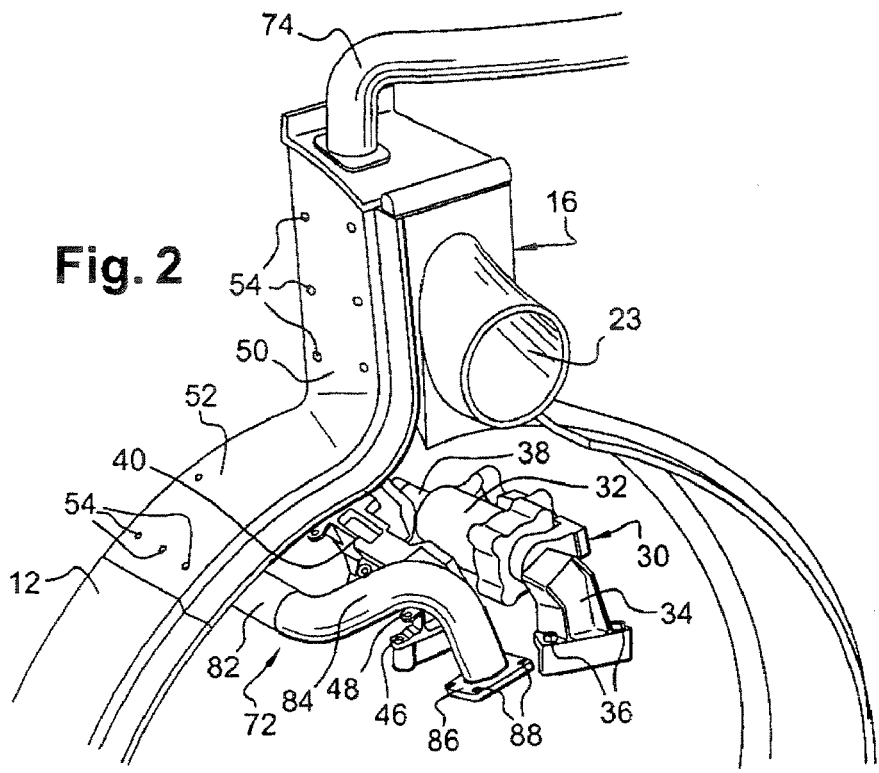
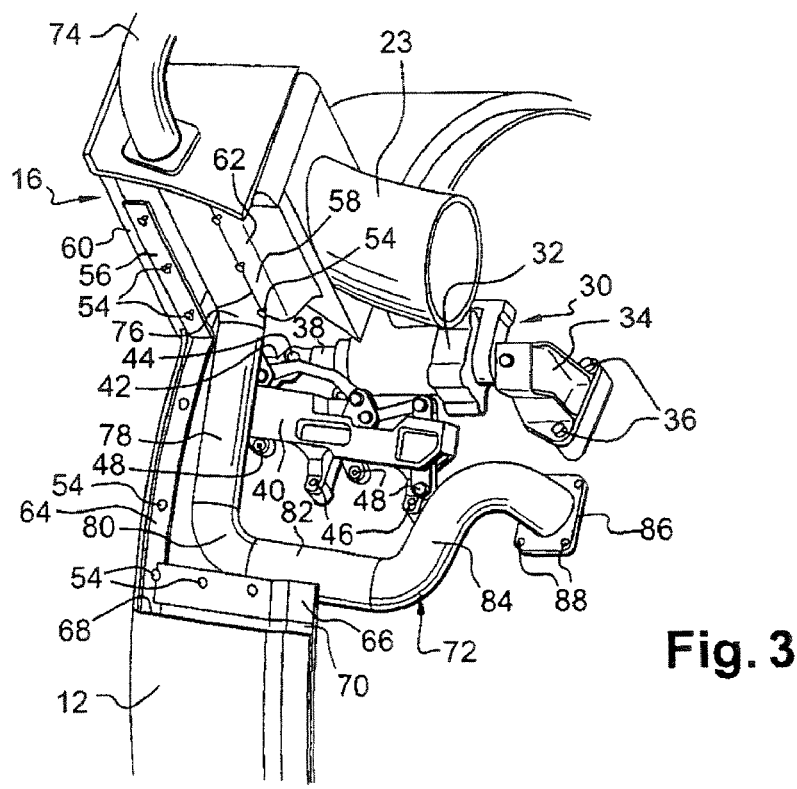

DEVICE FOR SUPPORTING AND HOUSING AUXILIARIES IN A BYPASS TURBOJET

BACKGROUND OF THE INVENTION

The present invention relates to a device for supporting and housing auxiliaries in a bypass turbojet, this device comprising two coaxial case rings arranged one inside the other and connected by tubular radial arms through which fluid ducts and electric cables pass.

This device is mounted around a compressor of the turbojet, downstream of the fan and upstream of a turbine of the turbojet, and can cooperate via its external case ring with a thrust reverser mounted downstream of this device.

The internal and external case rings of the device define between them an annular flow path for the bypass stream which originates from the fan of the turbojet and which is intended in particular for cooling components of the turbojet.

DESCRIPTION OF THE PRIOR ART

In the known art, the radial arms of this device are in one piece and the internal case ring comprises panels in the form of cylinder portions (extending for example over 90°) which are fastened by screws to a support bracket and which can be disassembled to allow access to equipment installed on the external casing of the compressor for a maintenance operation.

However, this technique does not make it possible to gain access to equipment situated inside the internal case ring in alignment with the radial arms, for example of the Line Replaceable Unit (LRU) type such as actuators for controlling the angular setting of the compressor stators, which have to be able to be disassembled without disassembly of the case rings of the device for supporting auxiliaries.

SUMMARY OF THE INVENTION

The particular object of the invention is to provide a simple, effective and economic solution to the problems of the current art.

To this end, it proposes a device for supporting and housing auxiliaries in a bypass turbojet, comprising two coaxial case rings arranged one inside the other and connected by tubular radial arms through which fluid ducts and electric cables pass, wherein a lateral face of at least one radial arm comprises a detachable panel whose removal allows access to turbojet equipment situated radially inside the internal case ring in alignment with the radial arm.

In the device according to the invention, the radial arms situated above the turbojet equipment subject to maintenance operations each comprise on one of their lateral faces a detachable panel which is fastened by screws or the like to the radial arm. Maintenance operations on equipment situated in alignment with the radial arms are thus easier to carry out and can be performed directly on a turbojet mounted under the wing of an aircraft.

The removal of the detachable panels from the radial arms also makes it possible to have access to the electric cables or to the fluid ducts which pass through these radial arms. These ducts and cables can thus be disassembled and replaced easily.

According to another feature of the invention, the detachable panel comprises a radial portion fastened to the radial arm and a cylindrical portion for connection to the internal case ring. This improves access to and the visibility of the turbojet equipment situated inside the internal case ring, facilitates the use of tools for the disassembly and maintenance of said equipment, and allows the withdrawal of certain equipment for replacement thereof.

In a practical way, the radial portion of the detachable panel is placed and fastened, along at least some of its edges, on corresponding rims of the radial arm, and the cylindrical portion of this detachable panel is placed and fastened, along at least some of its edges, on corresponding rims of the internal case ring.

In the case where a fluid duct passes inside the radial arm and extends circumferentially in the internal case ring, the circumferential dimension of the circumferential portion of this duct is advantageously smaller than that of the cylindrical portion of the detachable panel of the radial arm in order to be able to gain access to this duct and extract it, if necessary, from the interior of the internal case ring.

This fluid duct is, for example a hot air circulation duct of which one end opens into a compressor of the turbojet for bleeding air and of which the other end is fastened to the external case ring and is connected to fluid circulation means.

The device also comprises sealing means such as gaskets clamped between the detachable panel and the radial arm and/or between the detachable panel and the internal case ring.

These sealing gaskets have good heat resistance and make it possible to limit or even prevent a fire occurring inside the engine from propagating radially outwardly into the bypass stream.

In one embodiment of the invention, the device comprises two radial arms diametrically opposed with respect to the axis of the case rings, each comprising a detachable panel for access to an equipment item situated inside the internal case ring, this equipment item being, for example, an LRU-type actuator for controlling variable-setting stators.

The invention also relates to a detachable panel for a device of the above-described type, this detachable panel being characterized in that it is substantially L-shaped and comprises a radial flat plate connected to a plate curved in a circular arc, this panel having a series of bolt fitting holes along at least one of its longitudinal edges and along the terminating edge of the curved plate.

This detachable panel is preferably equipped with sealing gaskets along the edges of its radial and curved plates.

BRIEF DESCRIPTION OF THE DRAWINGS

The invention will be better understood, and other details, features and advantages of the present invention will become apparent, on reading the description below given by way of nonlimiting example with reference to the appended drawings, in which:

FIG. 2 is a larger scale schematic part view of this device and represents a radial arm equipped with a detachable panel;

FIG. 3 is another schematic perspective view of the radial arm of FIG. 2, its detachable panel having been withdrawn;

DESCRIPTION OF THE PREFERRED EMBODIMENTS

Figure 1:
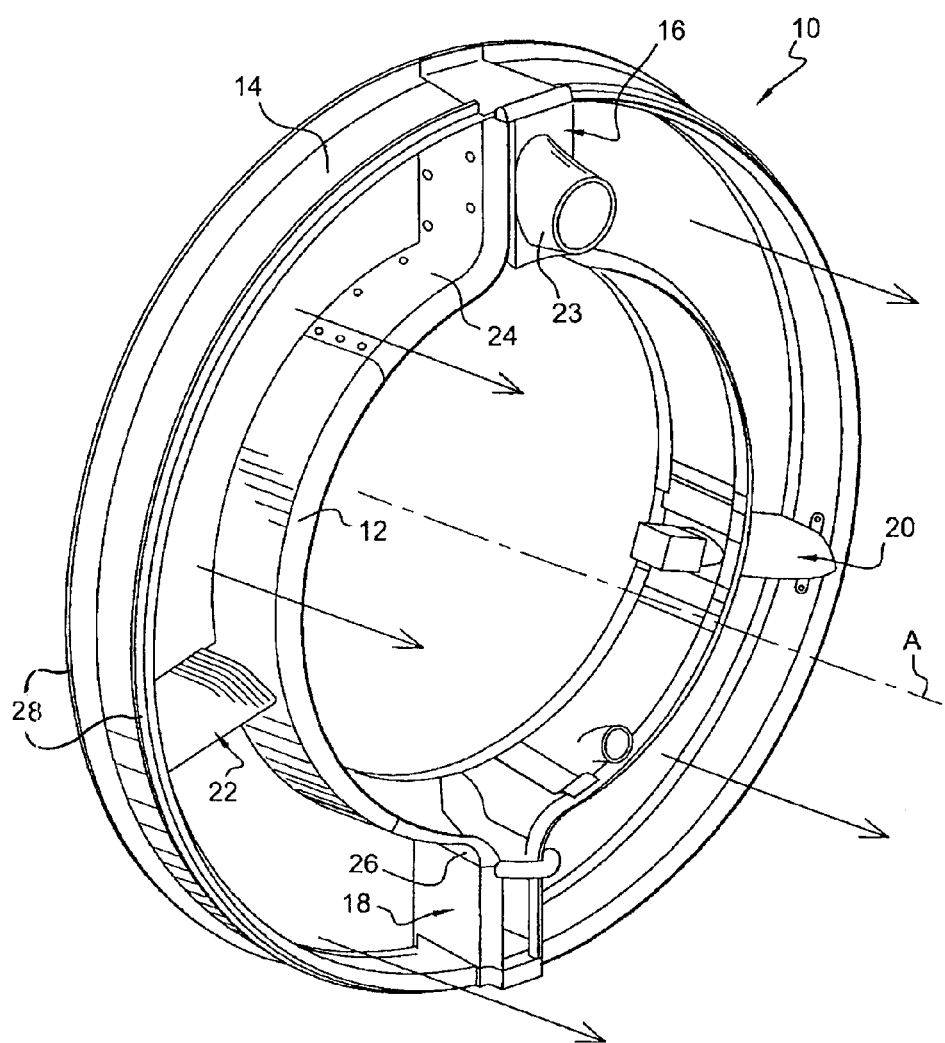
FIG. 1 is a schematic perspective view of a device according to the invention for supporting and housing auxiliaries in a bypass turbojet, seen from the downstream end.
Figure 4:
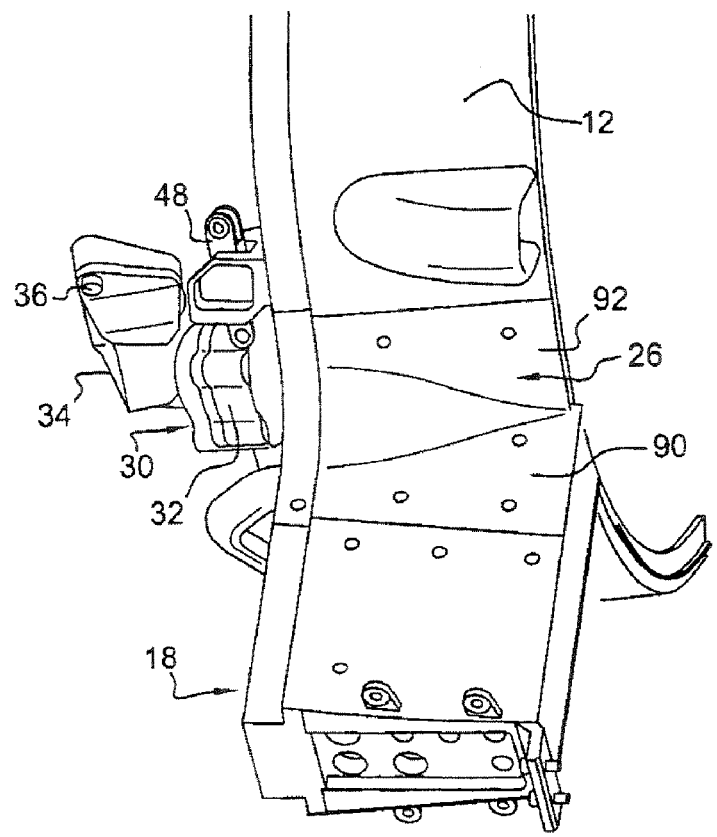
FIG. 4 is a larger scale schematic part view of the device of FIG. 1 and represents another radial arm equipped with a detachable panel.
Figure 5:
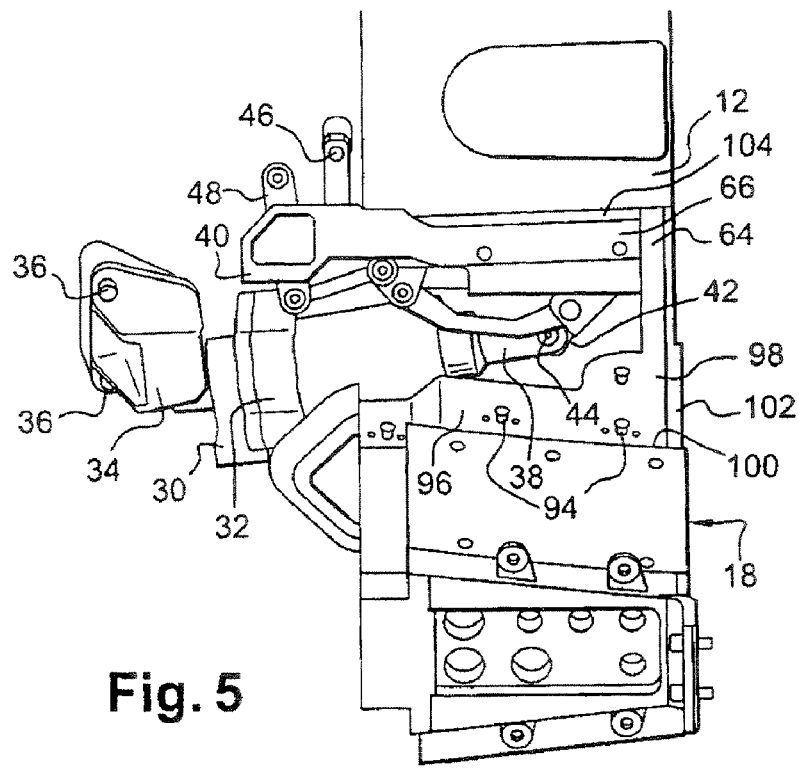
FIG. 5 is another schematic perspective view of the radial arm of FIG. 4, its detachable panel having been withdrawn.

FIG. 1 represents a device 10 according to the invention for supporting and housing auxiliaries in a bypass turbojet, this device comprising two coaxial cylindrical case rings 12, 14 which extend one around the other and which are interconnected by radial arms 16, 18, 20 and 22, some of these arms 16, 18 having a detachable lateral panel 24, 26 allowing access to turbojet equipment situated inside the internal case ring, and at least partly in alignment with the radial arm, for a maintenance operation.

This device is mounted downstream of the turbojet fan and the internal case ring 12 surrounds an external casing of the turbojet compressor, at a distance from this casing, and extends axially in alignment with another casing of the turbojet. The internal case ring 12 defines, with the external case ring 14, an annular flow path for the bypass stream originating from the fan, which is schematically represented by arrows.

At its upstream and downstream ends, the external case ring 14 comprises external annular rims 28 for attachment, by suitable means, to an intermediate casing of the turbojet and to a thrust reverser, respectively. The external case ring 14 provides for the transmission of forces between the intermediate casing and the thrust reverser, this latter being, for example, of the type comprising doors.

The radial arms 16, 18, 20, 22 number four in the example represented.

Two of these radial arms 16, 18 are diametrically opposed with respect to the axis A of the device and extend substantially in a vertical plane. The upper arm 16 is termed the "12 o'clock arm" and the lower arm 18 is termed the "6 o'clock arm" by analogy with a clock dial, and the other two radial arms 20, 22 are situated one on either side of the lower arm 18, at about 60° therefrom, and are termed the "4 o'clock arm" and "8 o'clock arm".

These arms 16, 18, 20, 22 are tubular and are open at their internal and external ends so that components situated radially inside and outside the device can be connected to fluid ducts and electric cables passing inside the arms.

For example, electric cables pass inside the arm 20, a fuel duct passes inside the arm 22, an oil duct passes inside the arm 18, and an air duct passes inside the arm 16.

Another air duct 23 comprises an end section mounted on a downstream portion of the upper arm 16 and extends substantially parallel to the axis A of the device. This duct is connected upstream to means for bleeding air from the bypass stream and downstream to suitable air circulation means for cooling components of the turbojet and supplying air to the cockpit of the aircraft equipped with this turbojet.

In the example represented in FIGS. 2 to 5, the upper 16 and lower 18 radial arms each have a disassemblable lateral panel 24, 26 allowing access to components which are mounted on the casing (not shown) of the compressor and which are in alignment with the radial arm.

The detachable panel 24 of the arm 16 is substantially L-shaped and comprises a flat plate 50 intended to extend radially over the side of the arm 16 to close it, said plate being connected at its internal end to a plate 52 curved in a circular arc which forms a portion of the internal case ring 12 that is adjacent to the arm.

The plate 50 is placed and fastened by means of screws 54, along its upstream and downstream edges, on corresponding radial rims 56, 58 which extend along the upstream 60 and downstream 62 lateral edges of the arm 16, respectively (FIG. 3).

The plate 52 is placed and fastened by means of screws 54, along its upstream edge and its lateral end opposed to the arm 16, on a circumferential rim 64 which extends along the upstream end of the case ring 12 and on an axial rim 66 which extends in the upstream to downstream direction on the case ring, respectively. The circumferential rim 64 for supporting the plate 52 connects the axial rim 66 to the upstream radial rim 56 of the arm 16.

The axial rim 66 of the case ring 12 comprises on its external surface an axial groove 70 in which a sealing gasket (not shown) is housed. This gasket is intended to be clamped between the rim 60 of the case ring and the plate 24 so as not only to prevent bypass stream air from passing radially inside the internal case ring but also to prevent any fire occurring in the turbojet from propagating radially outwardly into the bypass stream.

The detachable panel 26 of the arm 18 is likewise L-shaped and is smaller in size than the panel 24.

The panel 26 comprises a flat plate 90 which extends radially and substantially vertically mid-way over the side of the arm 18 and which is connected to a plate 92 curved in a circular arc which extends over the internal case ring 12.

The plate 90 is placed and fastened by screws 94, along its radially external edge and its upstream edge, on corresponding rims 96, 98 of the arm, respectively. The rim 96 extends axially in the upstream to downstream direction along the radially internal lateral edge 100 of the arm, and the rim 98 extends radially along the upstream lateral edge 102 of the arm. The plate 92 is placed and fastened on rims 64, 66 of the case ring, as described above for the plate 52 with reference to FIG. 3.

A sealing gasket (not shown) is housed in an axial groove 104 in the rim 66 of the case ring and clamped between this rim 66 and the plate 26. Sealing gaskets may also be provided in grooves in the axial rim 96 of the arm and in the circumferential rim 64 of the case ring 12.

In the example represented, the removal of the panels 24, 26 from the arms 16, 18 allows maintenance operations to be carried out on actuators 30 and a fluid duct 72 which are mounted on the compressor casing in alignment with or in the vicinity of the arms 16, 18.

The actuators 30 extend in the upstream direction substantially parallel to the axis A of the device. The body 32 of each actuator is supported by a lug 34 fastened by means of screws 36 or the like to the compressor casing.

The piston rod 38 of each actuator is connected by a link rod 42 to a mechanism 40 for the angular setting of compressor stators, one end of which link rod is coupled in rotation with the mechanism 40 and the other end of which is articulated on the piston rod 36 by a nut-and-bolt-type system 44 or the like.

The mechanism 40 is fastened to the casing by screws 46 and connected by suitable means 48 to control rings (not shown) which surround the compressor casing and which can be rotated about the axis of the turbojet to rotate the compressor stators about their axes.

The removal of the panels 24, 26 allows access to be had to the fastening screws of the actuators, which are in alignment with the radial arms.

An air duct 72 passes inside the arm 16 and comprises a radially internal end fastened to the compressor casing and opening into the compressor for bleeding hot air, and a radially external end fastened to the external case ring 14 and connected to another conduit 74 intended, for example, for feeding air to the turbojet nacelle for the purpose of deicing the latter.

The duct 72 extends radially from its external end fastened to the external case ring 14 to an elbow 76 for connecting to a circumferential portion 78 of the duct that extends inside the internal case ring 12 along and in the vicinity of the circumferential rim 64 of the case ring 12.

That end of the duct portion 78 opposed to the arm 16 is connected by another elbow 80 to an axial portion 82 of the duct which extends in the downstream direction and which is connected at its downstream end to an elbow 84 whose free end has a flange 86 intended to be fastened to the compressor casing by means of screws 88.

The removal of the detachable panel 24 also allows access to be had to the fastening screws 88 of the duct 72 for disassembly thereof. For this purpose, the circumferential dimension of the curved plate 52 of the panel 24 is greater than that of the portion 78 of the duct 72 in order to facilitate extraction of the duct.

The invention claimed is:

1. A device for supporting and housing auxiliaries in a bypass turbojet, comprising:
    a first coaxial case ring and a second coaxial case ring, the first coaxial case ring is arranged inside the second coaxial case ring; and
    tubular radial arms which connect the first coaxial case ring and the second coaxial case ring, through which tubular radial arms fluid ducts and electric cables pass, a first tubular radial arm and a second tubular radial arm extending substantially in a vertical plane, the first radial arm being disposed above the second radial arm,
    wherein a lateral face of the first radial arm comprises a first detachable panel whose removal allows access to turbojet equipment situated radially inside the first case ring in alignment with the radial arm, the first detachable panel includes a radial portion fastened to the first radial arm and a cylindrical portion connected to the first case ring, and
    wherein a first portion of a fluid duct extends substantially radially inside the first radial arm and a second portion of the fluid duct extends substantially circumferentially inside the first case ring, a circumferential dimension of the second portion of the fluid duct is smaller than a circumferential dimension of the cylindrical portion of the first detachable panel.

2. The device as claimed in claim 1, wherein the radial portion of the detachable panel is fastened by screws to the radial arm.

3. The device as claimed in claim 2, wherein the radial portion of the detachable panel is placed and fastened, along at least one of its edges, on corresponding rims of the radial arm, and the cylindrical portion of the detachable panel is placed and fastened, along at least one of its edges, on corresponding rims of the first case ring.

4. The device as claimed in claim 1, further comprising gaskets which are clamped between the detachable panel and at least one of the radial arm or the first case ring.

5. The device as claimed in claim 1, wherein the fluid duct is a hot air circulation duct, a first end of the fluid duct opens into a compressor of the turbojet for bleeding air and a second end of the fluid duct is fastened to the second case ring and is connected to fluid circulation means.

6. The device as claimed in claim 5, wherein the fluid duct includes a third portion which extends in an axial direction, a downstream end of the third portion is connected to a first elbow, the first elbow includes a flange which is fastened to the compressor, and an upstream end of the third portion is connected to a second elbow, the second elbow connects the upstream end of the third portion of the fluid duct to a downstream end of the second portion of the fluid duct.

7. The device as claimed in claim 6, wherein the fluid duct includes a third elbow which connects an upstream end of the second portion of the fluid duct to a downstream end of the first portion of the fluid duct, an upstream end of the first portion of the fluid duct is the second end of the fluid duct and the fluid circulation means includes a conduit which feeds air to a nacelle of the turbojet.

8. The device as claimed in claim 1, wherein the first detachable panel provides access to an equipment item situated inside the first case ring.

9. The device as claimed in claim 8, wherein the equipment item accessible by removal of the detachable panel is an actuator for controlling variable-setting stators.

10. The device described in claim 1, wherein the first detachable panel is substantially L-shaped and comprises a radial flat plate connected to a plate curved in a circular arc, this panel having a series of screw fitting holes along at least one of its longitudinal edges and along the terminating edge of the curved plate.

11. The device as claimed in claim 10, wherein the first detachable panel comprises sealing gaskets along the edges of its radial and curved plates.

12. The device as claimed in claim 1, wherein a lateral face of the second radial arm includes a detachable panel whose removal allows access to turbojet equipment situated radially inside the first case ring in alignment with the radial arm, the second detachable panel includes a radial portion fastened to the second radial arm and a cylindrical portion connected to the first case ring, and an oil duct passes inside the second radial arm.

13. The device as claimed in claim 12, further comprising a third radial arm disposed between the first radial arm and the second radial arm and a fourth radial arm disposed opposite the third radial arm,
    wherein electric cables pass inside the third radial arm and a fuel duct passes inside the fourth radial arm.

14. The device as claimed in claim 1, wherein an air duct is mounted on the first radial arm, the air duct extends substantially parallel to an axis of the device, an upstream end of the air duct is connected to means for bleeding air from a bypass stream and a downstream end of the air duct is connected to air circulation means for cooling components of the turbojet and means for supplying air to a cockpit of an aircraft.

* * * * *